United States Patent [19]
Cherry

[11] 3,791,227
[45] Feb. 12, 1974

[54] VIBRATION FREE PISTON ENGINE
[76] Inventor: Myron E. Cherry, P.O. Box 4213, Las Cruces, N. Mex. 88001
[22] Filed: Apr. 21, 1972
[21] Appl. No.: 245,836

[52] U.S. Cl. .................. 74/52, 74/604, 123/192 B
[51] Int. Cl. ............................................. F16h 37/12
[58] Field of Search...... 74/52, 603, 604; 123/192 B

[56] References Cited
UNITED STATES PATENTS
3,513,721  5/1970  Valbjorn et al. ...................... 74/603

FOREIGN PATENTS OR APPLICATIONS
431,290   2/1948   Italy .................................... 74/52
875,110   3/1953   Germany ............................. 74/52
1,241,833 8/1960   France ................................. 74/52

*Primary Examiner*—Benjamin W. Wyche
*Assistant Examiner*—F. D. Shoemaker
*Attorney, Agent, or Firm*—William S. Dorman

[57] ABSTRACT

In combination with an apparatus having at least one stationary ring gear and one planet gear for each ring gear for converting rotary motion into rectilinear reciprocating motion of a reciprocating member attached to the pitch circle of the said planet gear by rotary attach means, a planet gear swallowing counterweight for each planet gear having mass sufficient to offset that of the reciprocating member, the counterweight having a cross sectional shape which is quadrilaterally symmetrical about its center of gravity, the center of gravity of the counterweight being located on a line passing through the pitch circle of the planet gear, diametrically opposite the reciprocating member and offset from the axis of the planet gear by a distance equal to one half the pitch diameter of the planet gear for substantially eliminating vibration therefrom while simultaneously providing offset counterbalancing for the reciprocating member.

5 Claims, 6 Drawing Figures

PATENTED FEB 12 1974 3,791,227

PATENTED FEB 12 1974 3,791,227
SHEET 2 OF 2
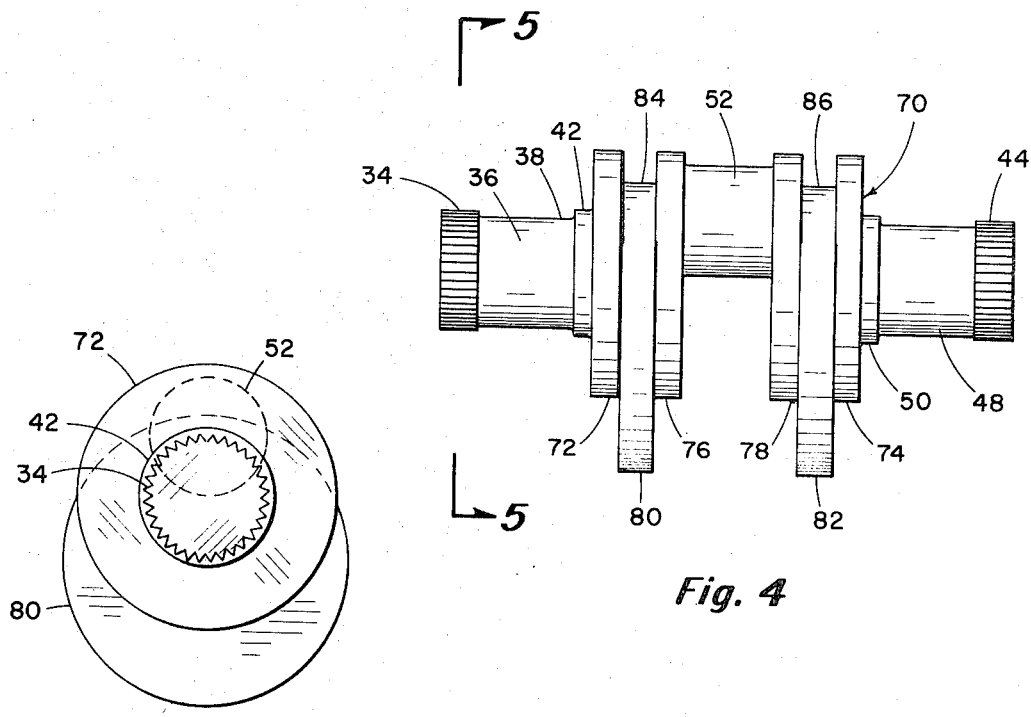
Fig. 4
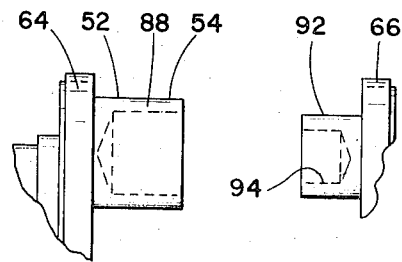
Fig. 6
Fig. 5
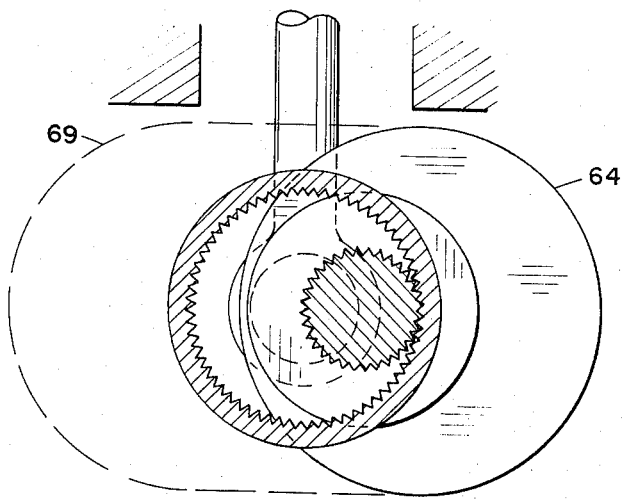
Fig. 3

VIBRATION FREE PISTON ENGINE

BACKGROUND OF THE INVENTION

1. Field of the Invention

This invention relates to improvements in internal combustion engines having reciprocating pistons with piston connection rods being rigidly secured thereto whereby each piston connecting rod is rotatably attached to planet gears on the crank throw of the crankshaft, the said planet gears being in meshing engagement with stationary ring gears, and more particularly, but not by way of limitation, to a planet gear swallowing counterweight which is designed to virtually eliminate engine vibration. This invention is applicable to any planet gear arrangement whereby rotary motion is being translated into rectilinear reciprocating motion.

2. Description of the Prior Art

Internal combustion engines which utilize a planet gear and associated ring gear for translating crankshaft rotary motion into rectilinear reciprocating motion of the pistons normally provide counterweights for these planet gears similar to the counterweight 20 disclosed in the patent to J. W. Pitts, U.S. Pat. No. 1,056,746 issued Mar. 18, 1913 and entitled "Mechanical Movement." These planet gear counterweights are primarily designed to offset the combined weights of the piston, the piston connecting rod, and the connecting rod journal the center axis of which is aligned adjacent to the pitch circle of the planet gear diametrically opposite to the position of the planet gear counterweight. The center of gravity of the normal planet gear counterweights is usually located on an extension of the line between the piston rod journal and the center of the planet gear somewhere outside of the pitch circle of the planet gear. While this method is adequate to counterbalance the combined weights of the piston, piston connecting rod and piston rod journal, it has the distinct disadvantage of creating a source of engine vibration inherently in its design. The design of a piston engine utilizing a planet gear in meshing engagement with a stationary ring gear for translating the rotary motion of the crankshaft into rectilinear reciprocating motion of the piston and associated piston connecting rod usually provides for the center line of the connecting rod journal to be aligned with the pitch circle of the planet gear. It is readily apparent that so long as the pitch diameter of the stationary ring gear is twice that of the planet gear, any point aligned with the pitch circle of the planet gear travels in a straight line reciprocating motion which is sinusoidal in relation to time. Also, upon study of this particular planet gear arrangement it is also apparent that any point upon the planet gear which does not lie on its pitch circle will travel in an elliptical path as opposed to a straight line reciprocating path. Therefore, if the center of gravity of the counterweights normally used on this type of device, as hereinbefore described, is aligned outside the pitch circle of the planet gear, that point will travel in an elliptical path relative to the engine assembly as a whole, thereby creating a source of engine vibration. It should also be noted that even if the counterbalance center of gravity were located on the pitch circle of the planet gear diametrically opposite to the connecting rod journal, vibration could also be introduced by an unsymmetric shape of the counterbalance weight.

SUMMARY OF THE INVENTION

The present invention contemplates a novel planet gear swallowing counterweight particularly designed and constructed to eliminate engine vibration. This swallowing counterweight is quadrilaterally symmetric about a point aligned with the pitch circle of the planet gear diametrically opposite a point on the pitch circle with which a center axis of the connecting rod journal is aligned. The counterweight also is of diameter at least twice the diameter of the planet gear thereby tending to swallow the planet gear, which in turn further provides added strength between the attachment of the planet gear to the connecting rod journal. The quadrilaterally symmetrical shape of the swallowing counterweight, together with its center of gravity being aligned with the pitch circle of the planet gear results in simple horizontal rectilinear reciprocating motion of the swallowing counterweight relative to the engine assembly while providing balanced rotational motion about the alignment axis of the planetary gear, thereby virtually eliminating engine vibration normally introduced by a planetary gear assembly.

DESCRIPTION OF THE DRAWINGS

Other and further advantageous features of the present invention will hereinafter more fully appear in connection with a detailed description of the drawings in which:

FIG. 3 is an end sectional elevational view similar to FIG. 2 wherein the crankshaft has been rotated ninety degrees in a clockwise direction.

FIG. 4 is an elevational view depicting an alternate planet gear crank assembly embodying the invention.

FIG. 5 is a sectional elevational end view taken along the broken line of 5—5 of FIG. 4.

FIG. 6 is an elevational view of two-part connecting rod journal.

DETAILED DESCRIPTION OF THE PREFERRED EMBODIMENTS

Figure 1:
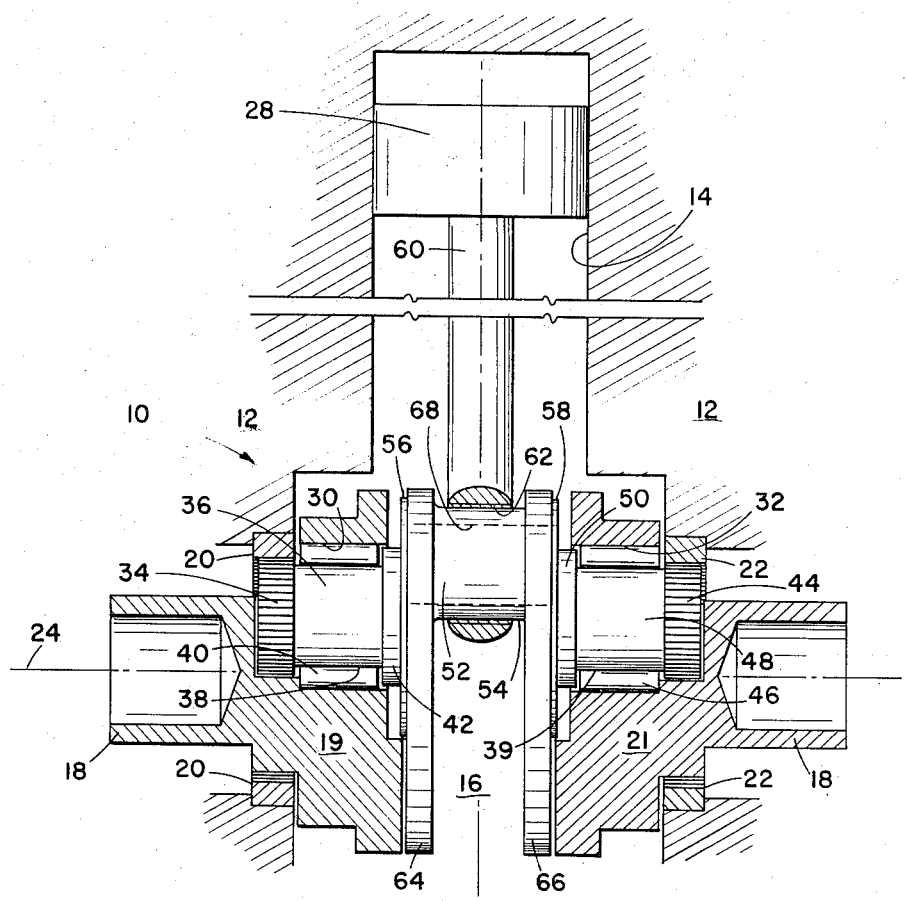
FIG. 1 is an elevational view of a single piston and associated crankshaft assembly, showing the stationary engine parts in section and also showing the connection rod bearing attachment in section. The piston is depicted at top dead center of travel.

Referring to the drawings in detail, reference character 10 generally indicates an internal combustion engine comprising an engine casing 12, having an elongated piston cylinder 14 secured thereto and providing a crank housing 16 in open communication with the piston cylinder. A crankshaft 18, having a center line axis of rotation 24, is journalled within the casing 12 and disposed within the crank housing 16 at a substantially right angle to the cylinder 14. The crankshaft 18 is provided with counterbalancing masses 19 and 21 constructed as an integral part thereof, to balance the offset masses of the planetary crank assembly and piston assembly carried by the crank throw apertures 30 and 32.

A planetary gear 34 having a cylindrical planetary crank journal 36 attached to the outer end thereof and in concentric alignment therewith, is journalled within the crank throw aperture 30 and disposed in meshing engagement with the ring gear 20, the pitch diameter of the said planetary gear 34 being one-half the pitch diameter of the ring gear 20. The planetary crank journal 36 is provided with a cylindrical outer bearing surface 38 which provides the inner bearing race for a plurality of roller bearings 40, bearings 40 being in rolling engagement between the bearing surface 38 of the planetary crank journal 36 and the crank throw apparatus 30 of the crankshaft 18. The inner end of the planetary crank journal 36 is provided with an outwardly extending flange member 42 which acts as a bearing stop means for the roller bearings 40. A second planetary gear 44, substantially identical to the planet gear 34 and having a planetary crank journal 48 secured to the outer end thereof and in concentric alignment therewith is oppositely disposed from the planetary gear 34. The crank journal 48 is journalled within the crank throw aperture 32 of the crankshaft 18 through suitable roller bearings 46 which are rollingly engaged between the planetary crank journal 48 and the crank throw aperture 32. The planetary gear 44 is disposed in meshing engagement with the stationary ring gear 22. The inner end of the planetary crank journal 48 is provided with an outwardly entending flange 50 which serves as a bearing stop for the roller bearings 46.

A cylindrical connecting rod journal 52 having an outer bearing surface 54 is disposed between the planetary crank journal flanges 42 and 50 and secured thereto by means of a pair of substantially identical attachment discs 56 and 58. The center line axis of the connecting rod journal 52 is disposed parallel to the center line axes of the crank throw apparatus 30 and 32 and offset therefrom by an amount equal to one-half the pitch diameter of the planet gears 34 and 44. The attachment disc 56 is disposed in concentric alignment with the planet gear 34 and rigidly secured to the flange member 42. The diameter of the attachment disc 56 is sufficiently large to encompass one end of the connecting rod journal 52 and is rigidly secured thereto. The attachment disc 58 is similarly attached to the flange 50 and the opposite end of the connecting rod journal 52. An elongated piston connecting rod 60 is rigidly secured at one end thereof to the piston 28, the opposite end of said connecting rod being rotatably secured through suitable bearing means 62 to the connecting rod journal 52.

A pair of substantially identical swallowing counterweights 64 and 66 are attached, one to each end of the connecting rod journal 52 and rigidly secured thereto. It is noted that the counterweights 64 and 66 may be secured between the opposite ends of the connecting rod journal 52 and the attachment discs 56 and 58, respectively. It is also noted that the swallowing counterweights 64 and 66 may be constructed as an integral part of the connecting rod journal 52. Each of the swallowing counterweights 64 and 66 are constructed to be quadrilaterally symmetrical about their own centers-of-gravity for purposes that will be hereinafter set forth. The cross sectional shape of each counterbalance weight 64 and 66, for purposes of describing the preferred embodiment, will be taken as circular as depicted in FIG. 2.

Figure 2:
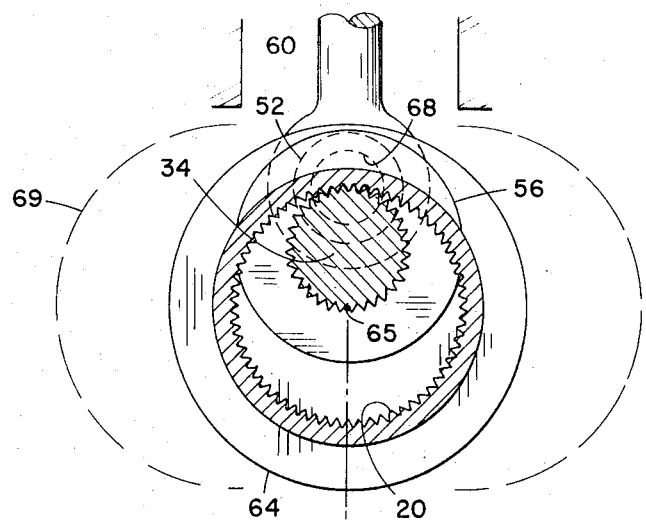
FIG. 2 is a sectional end elevational view of the crank assembly of FIG. 1, not showing the crankshaft.

The respective centers of gravity of each of the counterweights 64 and 66, such as the center of gravity 65 of the counterweight 64 shown in FIG. 2, aligned with the outer pitch circles of the planetary gears 34 and 44, diametrically opposite to the point on the pitch circles with which the center line axis of the connecting rod journal 52 is aligned. The combined weights of the counterweight 64 and 66 are equal to the combined weights of the piston 28, the connecting rod 60, the connecting rod bearings 62 and the connecting rod journal 52.

In operation, FIGS. 1 and 2 depict the crank assembly in a position which places the piston 28 at top dead center in the cylinder 14, with the crankshaft throw apertures 30 and 32 and their associated planetary gears 34 and 44 at the uppermost point in meshing engagement with the ring gears 20 and 22, respectively. FIG. 3 depicts the crank assembly after having rotated ninety degrees in a clockwise direction from the position depicted in FIG. 2, thereby placing the planet gear 34 at one side of the ring gear 20 which in turn has lowered the connecting rod journal 52 one-half of the piston stroke in line with the center line axis 26 of the cylinder 14. It is noted that the swallowing counterweight 64 has rotated ninety degrees in a counterclockwise direction about its own center-of-gravity 65 and has translated transversely to its outermost point perpendicular to both the center line axis 24 of the crankshaft 18 and the center line axis 26 of the cylinder 14. Reference character 69 indicates a broken line which describes the envelope of movement of the swallowing counterweight 64. Therefore, in effect, when the engine is running, the piston assembly with associated connecting rod 66 and connecting rod journal 52 move reciprocally along a line defined by the center line axis 26 of the cylinder 14, while the center of gravity of the swallowing counterweights 64 and 66 reciprocates transversely along a line which is perpendicular to both the center line axis 24 of the crankshaft and the center line axis 26 of the cylinder 14, thereby providing balanced motion between the piston and connecting rod assembly and the balancing planet gear counterweights 64 and 66, which virtually eliminates vibration from the planetary counterweight system. It is further noted that the connecting rod journal 52 may be provided with an elongated cylindrical bore 68 therein. If this bore is elongated to extend into the counterweight, the hollowed out portion of the counterweight can be subtracted from the piston and piston rod masses for the balance calculations. It is also noted that although this hollowed out portion 68 from the counterweights moves reciprocally along the axis 26 of the cylinder 14, it can be considered, for purposes of calculation, to be traveling at right angles thereto in conjunction with the geometric center of the counterweight which lies on the pitch circle of the planet gear and diametrically opposite the center line axis of the connecting rod journal 52. It is further noted that in the preferred embodiment depicted in FIGS. 1, 2 and 3, the cross-sectional diameter of the counterweights 64 and 66 is sufficiently large to encompass both the attachment flanges 42 and 50 for the planet gear crank journals and at the same time encompass the ends of the connecting rod journal in their entirety thereby providing additional strength due to the offset of the connecting rod journal 52 from the axis of the planetary gears 34 and 44.

It is noted that the sinusoidal rectilinear motion of the piston 28, connecting rod 60, bearings 62 and the perpendicular sinusoidal motion of the counter balance weights 64 and 66 is cancelled out by opposite vertical and horizontal components of the pure circular motion of the counterweight on the main crankshaft 18.

Referring now to FIGS. 4 and 5, reference character 70 generally indicates an alternate version of the planetary crank assembly to be used with a vibration free engine 10 specifically when the crank cavity 16 is limited in cross sectional size so as not to be sufficient to accomodate an envelope of movement of the counterweight as large as that of 69, shown in FIGS. 2 and 3. The planetary crank assembly 70 comprises the pair of oppositely disposed spaced planet gears 34 and 44 having the center line axis thereof coincident with each other. The planetary crank journal 36 having an outer bearing surface 38 is secured at the outer end thereof to the planetary gear 34 and in concentric alignment therewith. The inner end of the planetary crank journal 36 is provided with a flange 42 substantially identical to the assembly depicted in FIGS. 1, 2 and 3. Likewise, the planetary crank journal 48 having a planet gear 44 secured to the outer end thereof is provided at its inner end with an outwardly extending flange 50. A substantially cylindrical counterweight attach plate 72 is secured to the planetary crank journal flange 42 and in concentric alignment therewith. An oppositely disposed substantially identical cylindrical plate 74 is secured to the outwardly extending flange 50 of the planetary crank journal 48 and in concentric alignment therewith.

A cylindrical connecting rod journal 52 is centrally disposed between the planet gears 34 and 44 and has the center line axis thereof parallel to the axes of the planetary gears 34 and 44 and offset therefrom by one-half the diameter of the planetary gears 34 and 44 which, in effect, puts the center line axis of the connecting rod journal 52 in alignment with the outer pitch circles of the planet gears 34 and 44. The connecting rod journal 52 has a cylindrical plate 76 substantially identical to the cylindrical plate 72, secured to one end thereof, the center line axis of the said plate 76 being in alignment with the planetary crank journal 36. The connecting rod journal 52 has secured to the opposite end thereof a substantially identical cylindrical plate 78 also in concentric alignment with the planetary crank journal 48. A substantially cylindrical counterweight 80 is disposed between, and connected to, the plates 72 and 76, the center line axis of the said counterweight 80 being in alignment with the outer pitch circle of the planet gear 34 and diametrically opposite the center line axis of the connecting rod journal 52. An identical cylindrical counterweight 82 is disposed between, and connected to, the plates 74 and 78, the center line axis of the counterweight 82 being in concentric alignment with the center line axis of the oppositely disposed counterweight 80.

It should be noted that the cross sectional diameter of the counterweights 80 and 82 are sufficiently large to encompass the diameters of the planetary gears 34 and 44 therein, but not as large as the cross sectional diameter of the counterweight 64 and 66 in the application described in FIGS. 1, 2 and 3. Since the combined weight of the counterweights 80 and 82 must be equal to the combined weights of the piston 28 the connecting rod 60, the connecting rod bearings 62 and the connecting rod journal 52, as described hereinabove, the thickness of the said counterweights 80 and 82 must be greater than the thickness of the counterweights 64 and 66 in the above application. However, since the centers of gravity of the said counterweights 80 and 82 lie on a line between the outer pitch circles of the planet gears 34 and 44 diametrically opposite the center line axis of the connecting rod 52, perfect balance and vibration elimination will still be obtained. It is also noted in this application that additional engine weight will be incurred by the necessity of the additional cylindrical attachment plates 72, 74, 76 and 78. It should further be noted that the diameter of the counterweights 80 and and 82 should be kept as large as possible to provide additional strength to the planetary crank journal attachments with the connecting rod journal 52. In the arrangement of the planetary crank assembly 70 it will be noted that a pair of substantially identical notches 84 and 86 are formed where the counterweights 80 and 82 attach to the connecting plates 72, 76, 74 and 78. If the cross sectional diameter of the counterweights 80 and 82 were made substantially smaller the size of the notches 84 and 86 would be increased thereby weakening the planetary crank journal attachments with the connecting rod journal 52.

Referring now to FIG. 6 reference character 52 generally indicates a two part assembly of the connecting rod journal as shown in FIG. 1 wherein the said connecting rod journal 52 comprises an outer cylindrical sleeve member 88 which is rigidly secured to or made an integral part of the swallowing counterweight 64, the outer cylindrical surface 54 of the sleeve member 88 providing the inner race bearing for the connecting rod 60. An oppositely disposed shaft member 92, having an outside diameter substantially equal to the inside diameter of the sleeve member 88 sufficient for a press fit therein, is rigidly secured to or made an integral part of the swallowing counterbalance 66. It is noted that the shaft member 92 may be provided with an interior concentric bore 94 therein for weight reduction purposes. Upon assembly, the outer sleeve member 88 is journalled within the connecting rod 60 and in rolling engagement with the connecting rod bearing 62 and subsequently the shaft member 92 is inserted within the sleeve member 88 and secured thereto.

From the foregoing, it will be apparent that the present invention provides a perfectly balanced planetary crank assembly for use with a piston driven engine whereby the counterweight means for balancing the said planetary crank assembly is quadralaterally symmetrical about a line between the outer pitch circles of the planetary gears and diametrically opposite the center line of the connecting rod journal thereby providing a simple balanced rotation of the counterweights about their center of gravity while simultaneously providing simple translatory rectilinear reciprocating motion of the counterweight assembiles which in turn substantially eliminates vibration while providing proper counterbalance for the piston assembly. This novel planetary crank counterweight system is economical and durable in construction and simple and efficient in operation.

Whereas the present invention has been described in particular relation to the drawings attached hereto, it should be understood that other and further modifications apart from those shown or suggested herein may be made within the spirit and scope of this invention. For example, the rectilinear sinusoidal motion of the counter balance weights 64 and 66 may be used to provide a pumping action to provide intake air or the like to the engine.

What is claimed is:

1. In combination with an apparatus having a stationary ring gear and a planet gear engaging said ring gear for converting into rotary motion the rectilinear reciprocating motion of a reciprocating member rotatably attached to said planet gear at a point aligned with the pitch circle of said planet gear, a first counterweight carried by said planet gear to counterbalance the mass of said reciprocating member, said first counterweight being quadralaterally symmetrical and having its center of gravity aligned with the pitch circle of said planet gear opposite the point on the pitch circle with which the reciprocating member attachment point is aligned, a crankshaft upon which said planet gear is carried, rotated by movement of said planet gear within said ring gear, and a second counterweight carried by said crankshaft to rotate with said crankshaft in an opposite direction from said first counterweight to counterbalance said first counterweight and said reciprocating member, thereby substantially eliminating vibration of the apparatus.

2. The apparatus as set forth in claim 1 wherein said first counterweight is of circular shape.

3. Apparatus for changing rectilinear motion to rotational motion comprising:
   a mounting block having two interior channels with perpendicular intersecting axes;
   means within one of said channels providing rectilinear movement along the axis of said one channel,
   a pair of mutually parallel ring gears mounted within said block concentrically with the axis of said other channel,
   a pair of planet gears, each engaging a respective one of said ring gears,
   a pair of swallowing counterweights, each attached to a respective one of said planet gears, each being quadralaterally symmetrical about its center of gravity, and the center of gravity of each being aligned with the pitch circles of said planet gears;
   a connecting rod journal interconnecting said swallowing counterweights, to which said rectilinear movement providing means is rotatably attached, said connecting rod journal having a center axis aligned with the pitch circles of said planet gears at a point opposite that with which said swallowing counterweights are aligned, whereby said rectilinear movement means exhibits only a component of motion along the axis of said one channel and the center of gravity of said swallowing counterweights exhibit only a component of motion perpendicular to the axes of both said one and said other channels,
   a pair of crankshaft members each mounted to a respective planet gear and including,
      a shaft having an axis parallel to the axis of said other channel,
      a crankshaft counterweight,
      means for attachment to its respective planet gear, whereby when said planet gear rotates within said ring gear, said crankshaft member and crankshaft counterweight rotate, the counterweight thereby providing components of motion along the axis of said one channel and perpendicular to the axes of said one and said other channels to cancel the component of motion of said swallowing counterweights and the components of motion of said rectilinear movement providing means.

4. The apparatus of claim 3 wherein said swallowing counterweights are of circular shape.

5. The apparatus of claim 4 wherein said rectilinear movement providing means comprises a piston and a piston rod, said piston rod being operatively connected to said planetary gear.

* * * * *